United States Patent [19]

Aizu et al.

[11] 4,171,137

[45] Oct. 16, 1979

[54] SLINGER ARRANGEMENT FOR USE WITH BEARING OF SUPERCHARGER

[75] Inventors: Shoichi Aizu, Sakura; Masami Shimizu, Chiba, both of Japan

[73] Assignee: Ishikawajima-Harima Jukogyo Kabushiki Kaisha, Tokyo, Japan

[21] Appl. No.: 904,893

[22] Filed: May 11, 1978

[30] Foreign Application Priority Data

Jun. 1, 1977 [JP] Japan .............................. 52-71165[U]

[51] Int. Cl.$^2$ ........................ F16J 15/42; F01D 11/02
[52] U.S. Cl. ......................................... 277/25; 277/29; 277/67; 277/68; 277/133; 415/111; 415/175
[58] Field of Search ..................... 277/13, 14 R, 14 V, 277/25, 29, 59, 67–69, 74, 133–135; 415/111, 112, 53 R, 116, 170 R, 175, 169 R

[56] References Cited

U.S. PATENT DOCUMENTS

| | | | |
|---|---|---|---|
| 3,765,688 | 10/1973 | Junker | 277/14 R |
| 3,834,156 | 9/1974 | Cutler et al. | 123/119 B X |
| 3,961,867 | 6/1976 | Woollenweber | 415/110 X |
| 4,076,260 | 2/1978 | Legoy et al. | 277/25 |

FOREIGN PATENT DOCUMENTS

| | | | |
|---|---|---|---|
| 4363/31 | 1/1932 | Australia | 277/133 |
| 367215 | 2/1932 | United Kingdom | 277/133 |
| 406192 | 2/1934 | United Kingdom | 277/67 |
| 817432 | 7/1959 | United Kingdom | 277/67 |
| 896048 | 5/1962 | United Kingdom | 277/29 |

*Primary Examiner*—Robert S. Ward, Jr.
*Attorney, Agent, or Firm*—Scrivener, Parker, Scrivener & Clarke

[57] ABSTRACT

A slinger arrangement whereby the lubricating oil supplied to a bearing of a turbine shaft may be prevented from being sucked through one or more seal rings into a blower when the pressure in the blower becomes negative.

According to one embodiment of the present invention, the slinger consists of a large- and small-diameter sections, and a first seal ring is fitted into a circumferential groove formed in the large diameter section and contacts the lower end of first and second air vent chamber casings which is remote from a fan wheel, the first and second casings being axially spaced apart from each other and cooperating to define an air vent chamber, while a second seal ring is fitted into a circumferential groove formed in the small-diameter section and contacts the lower end of the other air vent chamber casing which is closer to the fan wheel. A circumferential oil throwing groove may be formed in the large-diameter section between the first and second seal rings.

6 Claims, 3 Drawing Figures

SLINGER ARRANGEMENT FOR USE WITH BEARING OF SUPERCHARGER

DETAILED DESCRIPTION OF THE INVENTION

The present invention relates to a slinger arrangement for use with a bearing of a supercharger.

The turbine shaft of a supercharger is driven at a high speed so that forced lubrication of bearings and thrust bushes for supporting the turbine shaft is required.

The pressure in the vicinity of the back surface of a blower impeller of the supercharger becomes negative within some speed range and some air flow rate range so that oil is sucked to flow into a blower through very small clearances and consequently entrained as oil mists in the air discharged from the blower, causing adverse effects on the operations and maintenance of the supercharger and its associated engine.

Figure 1:
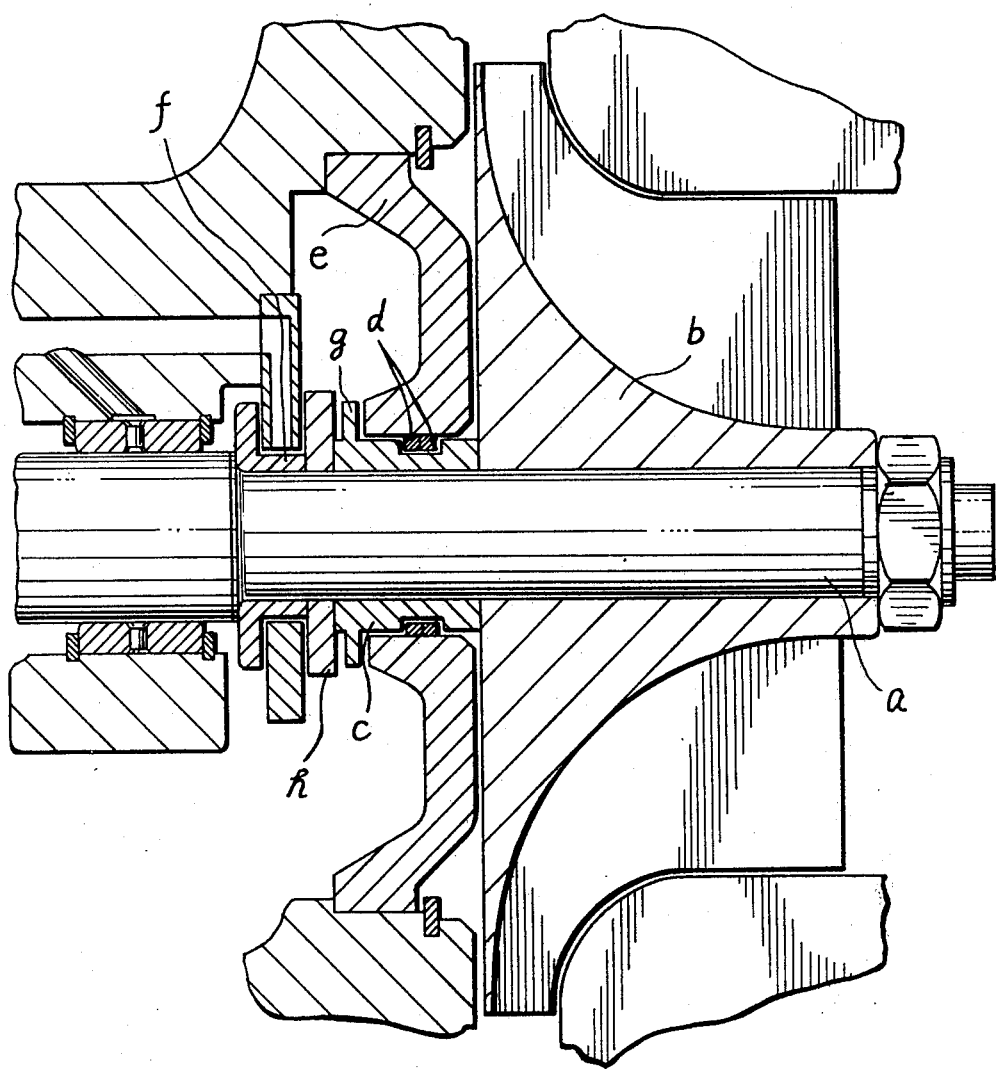

In order to overcome these problems, there has been invented and demonstrated a system as shown in FIG. 1. A thrust collar h is mounted on a turbine shaft a which also carries a blower impeller b. An oil slinger c which is mounted on the turbine shaft a between the thrust collar h and the blower impeller b is formed with a circumferential flange g which is spaced apart from the thrust collar h by a very small distance. The slinger c is also formed with a circumferential groove between the thrust collar h and one end in contact with the blower impeller b, and one or two seal rings d having the same diameter are fitted into this annular groove and are made into contact with a fixed member or a partition wall e.

In operation, the turbine shaft a, the blower impeller b, the thrust collar h and the slinger c are rotated in unison so that part of the oil supplied to a thrust bearing f is centrifugally thrown out of the flange g of the slinger c while the remaining oil which flows along the slinger c toward the blower impeller b is prevented from leaking into the blower by the seal rings d.

However there do exist small clearances between the side of the circumferential groove and the seal rings d fitted therein. As a result, when the pressure in the vicinity of the back surface of the blower impeller b becomes negative, the oil leaks through these clearances into the blower. Therefore in order to attain the satisfactory oiltight sealing by the use of these seal rings d, an amount of oil reaching the seal rings d must be minimized as practically as possible. However, the oil which flows along the surfaces of the slinger c, without having been centrifugally thrown out of its flange g, to the seal rings d is not subjected to the centrifugal throwing at this portion because the slinger c has the same diameter at this portion so that the effective centrifugal throwing effect due to the difference in centrifugal forces may not be produced. As a result, it has been extremely difficult to reduce the amount of oil leaking through the seal rings d to a negligible level.

The present invention was made to overcome the above and other problems encountered in the prior art sealing systems and will become apparent from the following description of preferred embodiments thereof taken in conjunction with the accompanying drawings, in which:-

Figure 2:
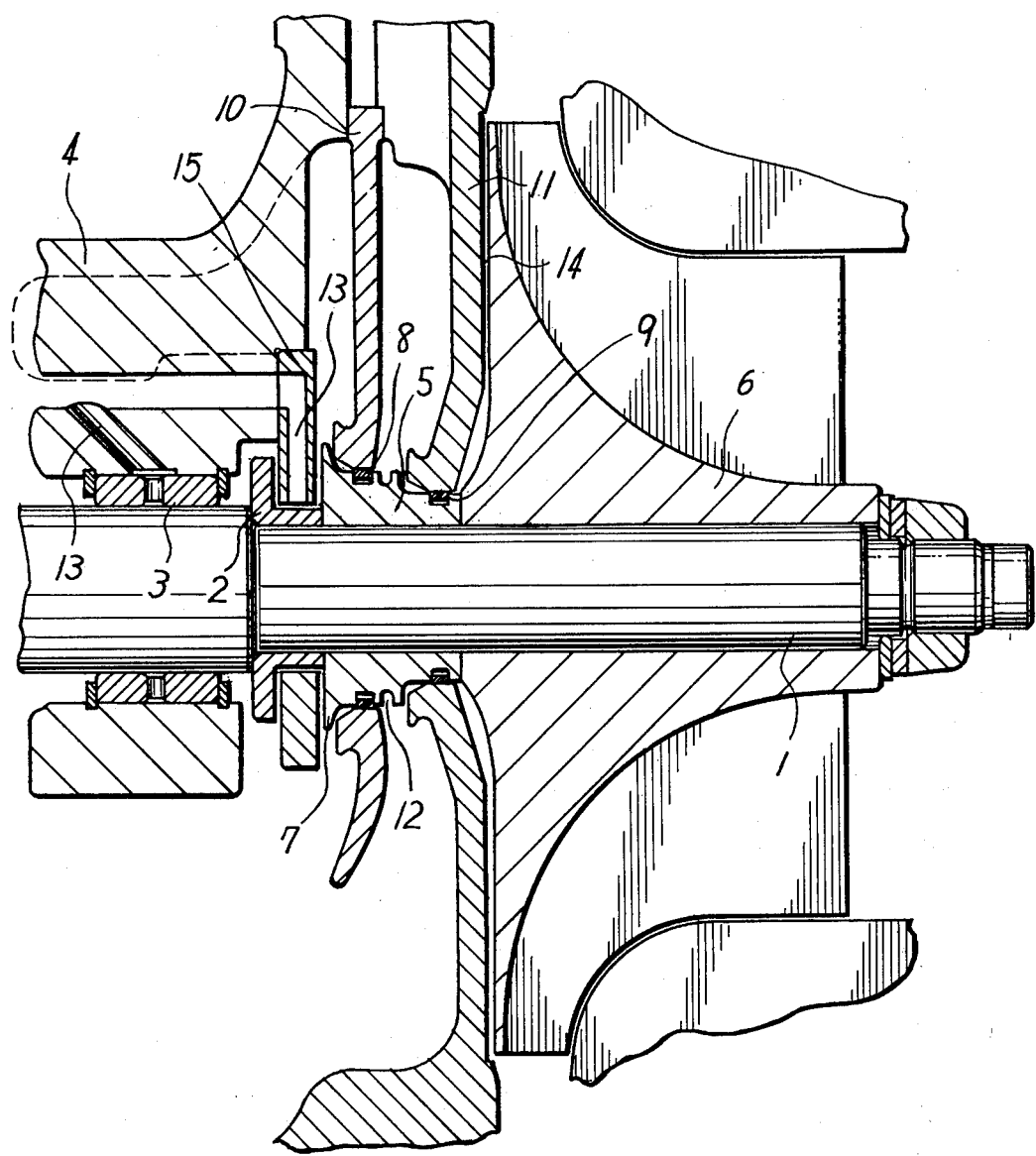
Figure 3:
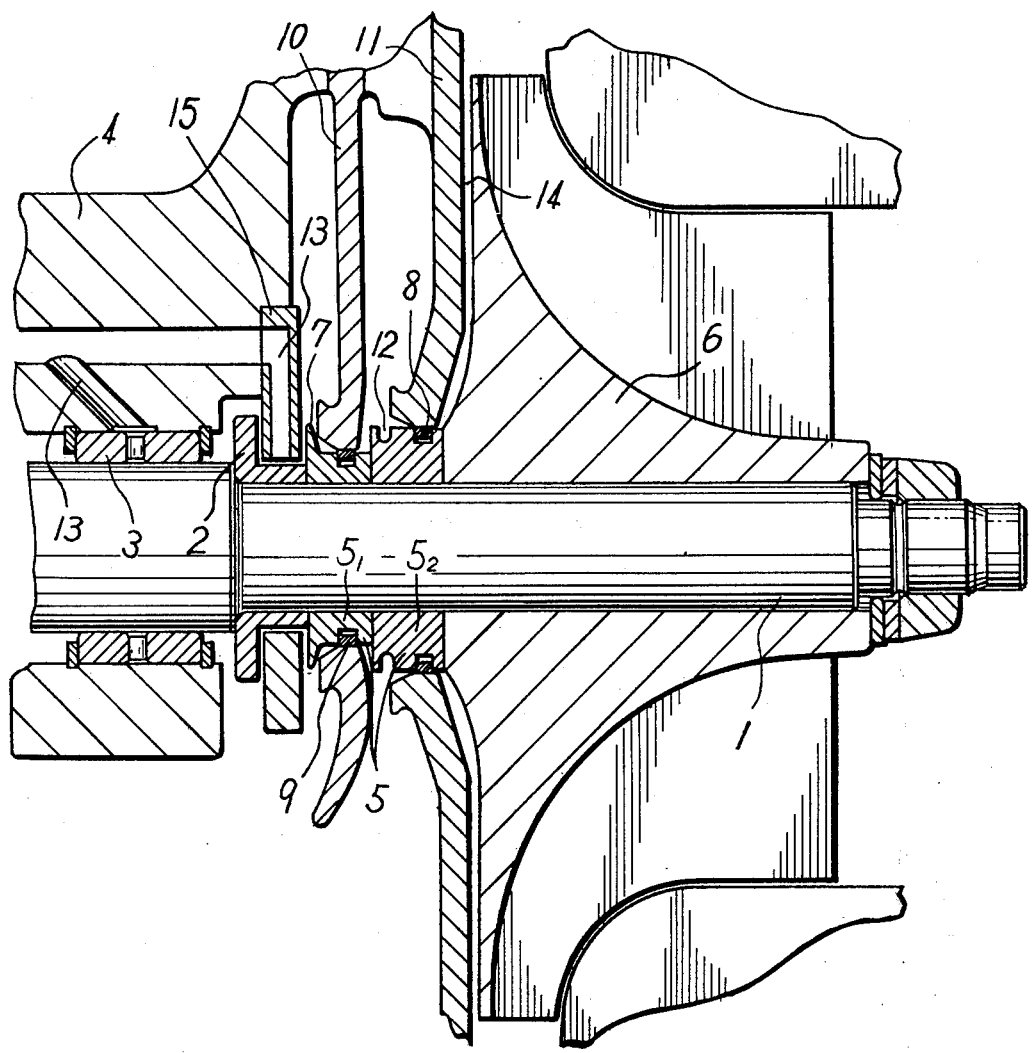

FIG. 1 is a fragmentary sectional view of a conventional supercharger showing its bearing and slinger arrangement; and FIGS. 2 and 3 are sectional views of superchargers incorporating first and second embodiments, respectively, of a slinger in accordance with the present invention.

First Embodiment, FIG. 2

Referring to FIG. 2, a turbine shaft 1 which carries a thrust bush 2, a slinger 5 and a blower impeller 6 for rotation in unison with the shaft 1 is rotatably supported by a bearing 3 which is in turn mounted in a bearing housing 4. A thrust bearing 15 is also mounted in a bearing housing 4.

The slinger 5 is stepped or has three diameters. That is, the slinger 5 has a flange or a circumferential projection 7 at one end in contact with the thrust bush 2, a large-diameter portion contiguous with the flange 7 and a small-diameter portion contiguous with the large-diameter portion and terminating at the other end in contact with the blower impeller 6. The large-diameter portion of the slinger 5 is formed with two circumferential grooves which are axially spaced apart from each other. A seal ring 8 is fitted into the circumferential groove closer to the flange 7, and the other circumferential groove 12 serves as an oil throwing groove. The small-diameter portion is also formed with a circumferential groove into which is fitted a seal ring 9. The lower ends of an air vent chamber backplate 10 and an air vent chamber casing 11 are made into contact with the seal rings 8 and 9, respectively. The back surface of the blower impeller 6 is spaced apart from the casing 11 by a small space or clearance 14.

Lubricating oil is forced through an oil supply passage 13 to the bearing 3 and the thrust bush 2.

Upon rotation of the blower impeller 6, the pressure in the blower and in the space 14 becomes negative at a certain flow rate range so that part of the lubricating oil supplied to the bearing 3 and the thrust bush 2 is sucked to flow toward the blower. However, the oil is subjected to the centrifugal throwing at the periphery of the flange 7 of the slinger 5, and the flow of oil along the peripheral surface of the large-diameter portion past the flange 7 is prevented by the seal ring 8. Some oil which leaks through the seal ring 8 and flows toward the seal ring 9 is subjected to the centrifugal throwing because of the step between the large- and small-diameter portions. Therefore the oil which actually reaches the seal ring 9 is very small in amount and is again prevented from flowing through the seal ring 9 towards the blower impeller 6. Thus the amount of oil which reaches the back surface of the blower impeller 6 is almost negligible.

Second Embodiment, FIG. 3

The second embodiment shown in FIG. 3 is substantially similar in construction to the first embodiment shown in FIG. 2 except that the slinger 5 is sectioned into a small-diameter section $5_1$ with the flange 7 which is made into contact with the thrust bushing 2 and a large-diameter section $5_2$ interposed between the small-diameter section and the blower impeller 6. The functions and effects of the second embodiment are substantially similar to those of the first embodiment, but the second embodiment is advantageous over the first embodiment in that because of the sectionalized slinger 5 consisting of the small- and large-diameter sections $5_1$ and $5_2$, the assembly may be much facilitated.

It is to be understood that the present invention is not limited to the first and second embodiments described above with reference to FIGS. 2 and 3, but various modifications may be effected without leaving the true spirit of the present invention.

In summary, according to the present invention two seal rings are mounted on the slinger and are axially spaced apart from each other, and the slinger is stepped in diameter between the two seal rings so that the oil flowing from one seal ring to the other along the surface of the slinger may be centrifugally thrown due to the difference in centrifugal forces at this stepped portion. As a consequence, the amount of the oil which reaches the other seal ring closer to the impeller is almost negligible so that the entrainment of the oil into the air discharged from the blower may be effectively eliminated.

What is claimed is:

1. A slinger arrangement for a bearing of a supercharger wherein a slinger which is mounted on a turbine shaft has a large-diameter portion and a small-diameter portion, and seal rings are fitted over said large- or small-diameter portion and made into contact with an air vent chamber casing and an air vent chamber backplate.

2. A slinger arrangement as set forth in claim 1 wherein a circumferential oil throwing groove is formed in the peripheral surface of said large-diameter portion of said slinger between said seal rings.

3. A slinger arrangement as set forth in claim 1 wherein said seal ring having a large diameter is fitted over said large-diameter portion and is made into contact with the air vent chamber backplate; and said ring having a small diameter is fitted over said small-diameter portion and is made into contact with the air vent chamber casing.

4. A slinger arrangement as set forth in claim 2 wherein said seal ring having a large diameter is fitted over said large-diameter portion and is made into contact with the air vent chamber backplate; and said ring having a small diameter is fitted over said small-diameter portion and is made into contact with the air vent chamber casing.

5. A slinger arrangement as set forth in claim 1 wherein said seal ring having a small diameter is fitted over said small-diameter portion and is made into contact with the air vent chamber backplate; and said ring having a large diameter is fitted over said large diameter is made into contact with the air vent chamber casing.

6. A slinger arrangement as set forth in claim 2 wherein said seal ring having a small diameter is fitted over said small-diameter portion and is made into contact with the air vent chamber backplate; and said ring having a large diameter is fitted over said large diameter is made into contact with the air vent chamber casing.

* * * * *